United States Patent [19]

Chong et al.

[11] 4,312,956
[45] Jan. 26, 1982

[54] FILTRATION AND DEIONIZATION PREPARED FROM CATIONIC AND ANIONIC EMULSION ION EXCHANGE RESINS

[75] Inventors: Berni P. Chong, North Wales; Eric G. Isacoff, Richboro; James W. Neely, Horsham, all of Pa.

[73] Assignee: Rohm and Haas Company, Philadelphia, Pa.

[21] Appl. No.: 49,538

[22] Filed: Jun. 18, 1979

Related U.S. Application Data

[62] Division of Ser. No. 943,890, Sep. 18, 1978.

[51] Int. Cl.$^3$ .......................... B01J 47/04; C02F 1/56
[52] U.S. Cl. ........................................ 521/28; 521/26; 210/686
[58] Field of Search ...................... 210/686; 521/28, 26

[56] References Cited

U.S. PATENT DOCUMENTS

| | | | |
|---|---|---|---|
| 3,250,704 | 5/1966 | Levendresky | 521/29 |
| 3,377,270 | 4/1968 | Capesci | 210/686 |
| 4,101,460 | 7/1978 | Small et al. | 521/32 |
| 4,187,120 | 2/1980 | Kunin et al. | 210/686 |
| 4,200,695 | 4/1980 | Chong et al. | 521/28 |

*Primary Examiner*—William F. Hamrock
*Assistant Examiner*—Peter F. Kulkosky
*Attorney, Agent, or Firm*—John E. Taylor, III

[57] ABSTRACT

Flocs prepared by mixing cationic and anionic emulsion ion exchange resins are useful as a filtration and deionization medium. Flocs prepared from weakly acidic and weakly basic emulsion ion exchange resins may be regenerated thermally.

10 Claims, 7 Drawing Figures

1μ
X 50,000

1μ
X 50,000

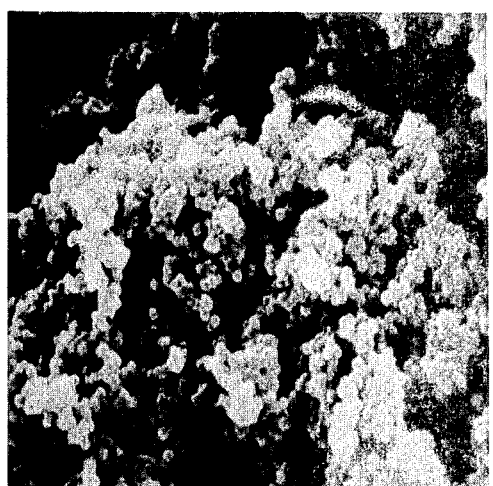
FIG. 4b X300
FIG. 4a X1000
FIG. 4d X3000
FIG. 4c X10,000

FILTRATION AND DEIONIZATION PREPARED FROM CATIONIC AND ANIONIC EMULSION ION EXCHANGE RESINS

This is a division of application Ser. No. 943,890 filed Sept. 18, 1978 pending.

BACKGROUND OF THE INVENTION

The present invention concerns fine-particle-size ion exchange resins and methods for their preparation. In particular it concerns spherical, crosslinked emulsion copolymer particles in a size range of from about 0.01 to about 1.5 micrometers in diameter, which bear ion exchange functional groups, and emulsions of these particles. It further concerns the preparation of these particles and emulsions, and the use of these particles and emulsions in removing dissolved and undissolved material from liquids.

Finely divided ion exchange materials have been used extensively as filter media for the simultaneous filtration and deionization of condensate water from steam turbine generators, and to a lesser extent in pharmaceutical applications such as drug carriers and tablet disintegrators, and in other commercial applications.

In the past such finely divided ion exchange materials have been produced by grinding or otherwise physically reducing the size of ion exchange particles produced by conventional processes involving the separate steps of polymerization—most commonly suspension polymerization—and functionalization.

Schultz and Crook (I & EC Product Research and Development, Vol. 7, pp. 120-125, June, 1968) have produced particles of ground ion exchange resin with average diameters of one micron or smaller, but the particles are not spherical, and the range of diameters within a given sample of such materials is large, i.e., the particles are not uniformly sized. Even though large particles may constitute only a small fraction of the total number of ground particles, they represent a much larger fraction of the sample weight. As a result, such ground resins exhibit settling of a significant fraction of the ion exchange material weight from aqueous suspension.

Suspension polymerization involves suspending droplets of organic liquid containing monomers, polymerization initiators and suspension stabilizers in an aqueous-phase medium. The droplet size, largely a function of agitation rate, controls the final polymer particle size, which normally ranges down to about 40 micrometers, although sizes down to 5 micrometers (U.S. Pat. No. 3,357,158) or 10 micrometers (U.S. Pat. No. 3,991,017) have been disclosed. Ion exchange materials have also been produced by bulk polymerization. Physically reducing the particle size of such polymers in bulk or bead form to sub-micron sizes is difficult and expensive, and produces material with undesirable physical characteristics such as irregular particle shape and broad particle-size distribution. It may also produce undesirable heat degradation of the resin.

Sub-micron sized, spherical polymer particles have been prepared in the past, including some with limited ion exchange functionality. These particles were prepared from monomers which contained ion exchange functional groups, such as acrylic and methacrylic acid, or dialkylaminoalkyl acrylates and methacrylates. In most cases the polymerization reaction used was emulsion polymerization. Thus Haag et al (U.S. Pat. No. 3,847,857) used "... from 5 to 70% by weight ... of one or more monomers containing an amine or quaternary ammonium group ... " (column 2, lines 56–59) in forming a functional, crosslinked emulsion ion exchange resin for use in paints and other coatings. Rembaum et al (U.S. Pat. No. 3,985,632) similarly prepared chromatographic adsorbents by emulsion polymerizing monomer mixtures containing minor amounts of monomers with amine functionality (column 5, lines 25–46). Fitch (U.S. Pat. No. 3,104,231) used up to 15% by weight of monomers containing carboxylic acid groups when preparing crosslinked emulsion copolymers. He cautions that higher content of such monomers leads "to either solubility of the copolymer in water or dilute alkali or significant swelling of the copolymer in such aqueous media." (column 6, line 70-column 7, line 4).

Hatch (U.S. Pat. No. 3,957,698) describes a precipitation polymerization for making crosslinked, spherical ion exchange resin particles in a size range similar to that of emulsion polymer particles. The precipitation process inherently produces larger particles, in the range of 0.1–10 micrometers (compare 0.01–1.5 mm for emulsion polymerization), and involves the precipitation of polymer particles from a monomersolvent solution in which polymer is insoluble. In emulsion polymerization the monomer is only slightly soluble in the solvent, and the polymer particles are formed when monomer-swollen soap mycelles contact solvent-phase-initiated polymer chains. Hatch mentions that "suitable micro bead resins can be prepared by suspension or emulsion polymerization . . . " He then describes suspension polymerization but fails to indicate any detail of an emulsion polymerization process (column 3, lines 30-40). The ion exchange microbeads of Hatch are weak acid resins made from carboxylic acid monomers such as acrylic or methacrylic acid, although the use of esters of these acids is mentioned, with hydrolysis subsequent to polymerization. Hatch exemplifies the preparation of a microbead from vinylbenzyl chloride (Example 4), but the particle size (3–7 microns) is clearly outside the range of the present invention, and no attempt is made to impart ion exchange functionality to the microbead itself until it has been incorporated in an ion exchange resin matrix. Hayward (U.S. Pat. No. 3,976,629) also prepared weakly acidic cation exchange resins of a size "less than 20 microns" using a modified suspension polymerization and carboxylic acid monomers.

Tamura (Nippon Kagaku Kaishi 76 (4), pages 654–8, 1976) discloses the preparation of strongly acidic cation exchange resin material from emulsion copolymers. Tamura coagulated styrene-divinylbenzene copolymer emulsions and functionalized them with fuming sulfuric or chlorosulfuric acids. He subsequently mixed the coagulum into a polypropylene membrane, but did not teach that the coagulum might be re-emulsified.

THE INVENTION

According to this invention a novel class of small-particle-size, spherical ion exchange resins, having particle diameters smaller than those heretofore known in the art, has been discovered. These resins are prepared from crosslinked emulsion copolymer particles, and may possess a degree of functionalization greater than about 0.7, and as high as about 1.5, functional groups per monomer unit. The process by which these resins are prepared involves functionalization of the emulsion copolymer particles with weakly acidic, strongly acidic, weakly basic or strongly basic ion exchange functional groups. The emulsion copolymer particles may be functionalized directly, as by hydrolysis, sulfonation, and similar reactions, or indirectly by such reactions as chloromethylation followed by a functionalization reaction such as amination. To facilitate handling of the particles, the emulsion may be coagulated, and the large coagulum particles handled like large polymer beads for isolation and reaction. Alternatively, the emulsion copolymer particles may be dried prior to functionalizing them. After functionalization the particles may be resuspended as an emulsion of discrete particles by high-shear mixing, ultrasonic vibration, mild grinding or other comminuting method which disrupts the agglomerated pieces without damaging the spherical particles of the emulsion ion exchange resin.

The ion exchange resins of this invention may be prepared in narrow particle-size ranges with mean values in the submicroscopic range (which term, as used herein, means having particle diameters below about 1.5 micrometers), variable from about 0.01 micrometers to about 0.5 micrometers in diameter, and by the use of special techniques, to as large as about 1.5 micrometers in diameter. They may be prepared as cation or anion exchange resins, that is, with strongly acidic, strongly basic, weakly acidic or weakly basic functionality.

FIGS. 1–3 and 4a–4d are electron photomicrographs of typical ion exchange materials of the present invention. FIGS. 1–3 are photomicrographs of three different sizes of anion exchange emulsion resins in the hydroxyl form, at a magnification of ×50,000. FIGS. 4a–4d are photomicrographs of a single floc at four different magnifications; the floc was prepared by mixing a cation exchange emulsion resin with an anion exchange emulsion resin. Each of the materials shown in these photomicrographs was prepared by methods taught herein.

Figure 1:
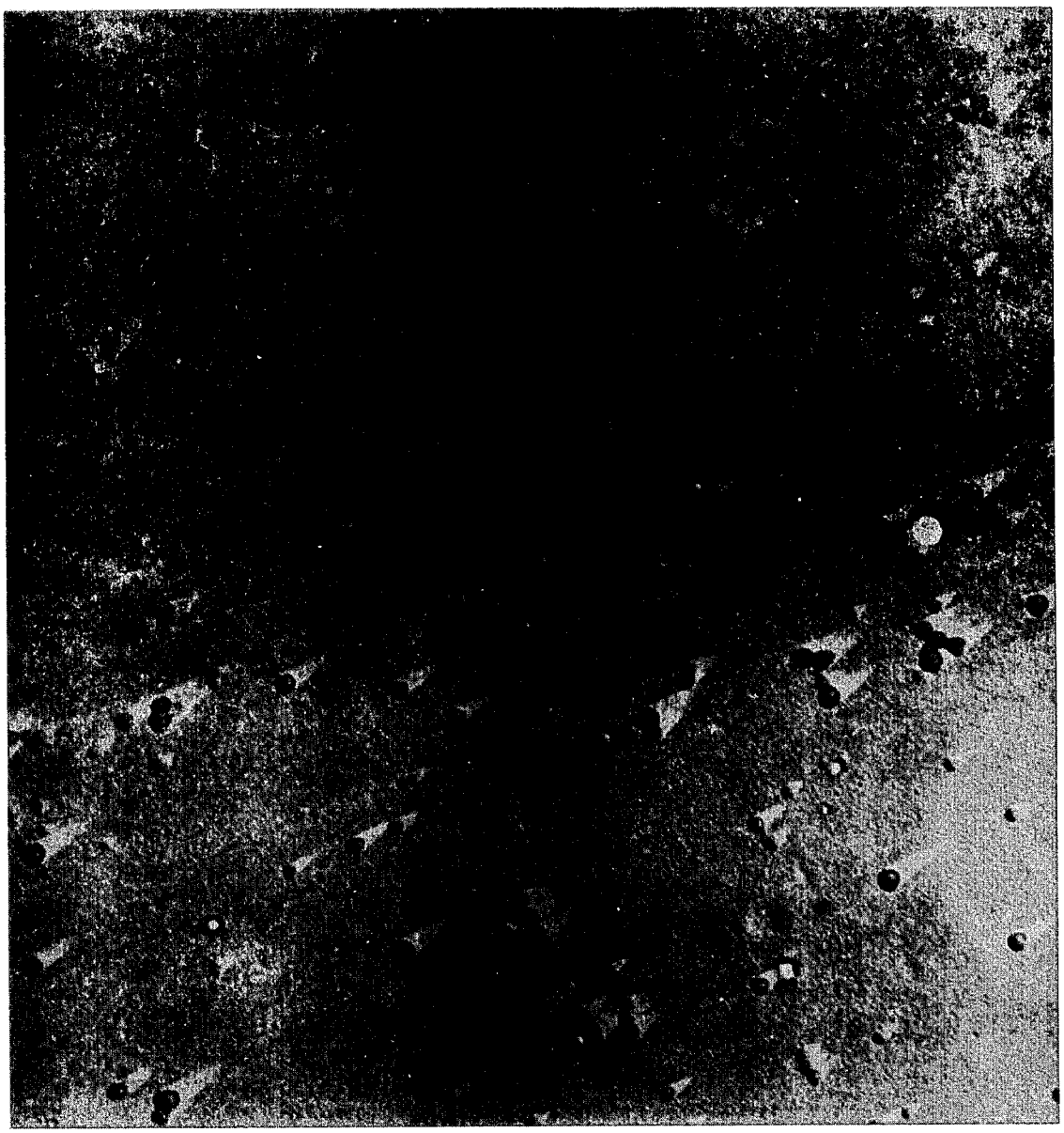
FIG. 1 shows a strongly basic anion exchange emulsion resin in the hydroxyl ion form, derived from a copolymer containing 3% (weight) divinylbenzene and prepared according to Example 14 below, coagulated according to Example 2 below, chloromethylated and aminated according to example 17 below, and converted to the hydroxyl form according to Example 21 below.
Figure 2:
FIG. 2 shows a strongly basic anion exchange emulsion resin in the hydroxyl ion form, derived from a copolymer containing 3% (weight) divinylbenzene and prepared according to Example 1 below, coagulated according to Example 2 below, chloromethylated and aminated according to Example 17 below, and converted to the hydroxyl form according to Example 21 below.
Figure 3:
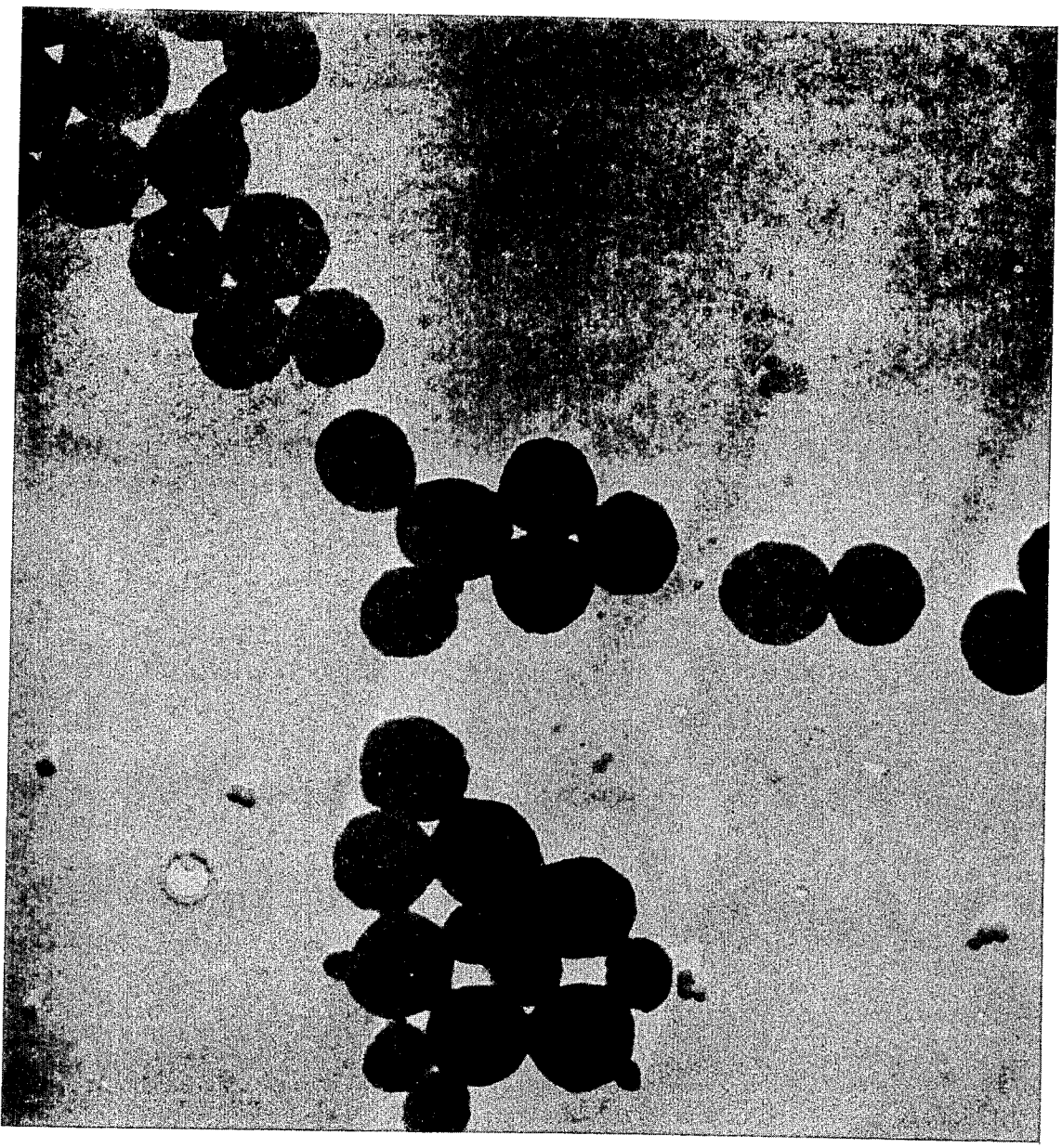
FIG. 3 shows the strongly basic anion exchange emulsion resin in the hydroxyl ion form of Example 21 below.

FIG. 4b shows the floc of Example 22 below at a magnification of ×300; FIG. 4a shows the same floc at a magnification of ×1000; FIG. 4d shows the same floc at a magnification of ×3000; and FIG. 4c shows the same floc at a magnification of ×10,000.

By referring to the particles shown in the figures, it may be seen that these particles are approximately spherical, that as prepared they have a relatively narrow particle-size distribution, and that they may be prepared in different particle sizes. The particles of these figures range in size from about 0.017 micrometers to about 0.45 micrometers.

Although the figures illustrate strongly basic anion exchange emulsion resins, the particles of other anion exchange emulsion resins, and of cation exchange emulsion resins, have similar appearances and size distribution.

The aggregations of particles in these figures were concluded by the laboratory preparing the photomicrographs to be artifacts associated with preparation of the samples for micrography.

In the case of strongly acidic and basic, and weakly basic resins, the formation of physically stable coagula from the crosslinked emulsion copolymers makes possible the isolation of the copolymers for functionalization. Because of their small particle size the emulsion copolymer particles cannot practically be filtered or otherwise separated from the liquids in which they are prepared, nor could functionalized copolymer particles be separated from the functionalization mixtures. After coagulation, the large coagulum particles can be filtered and washed in much the same way as ion exchange resin beads of conventional size. Functionalization of the coagulated emulsion copolymer involves conventional reactions well known in this art.

Weakly acidic emulsion copolymer resins have physical properties similar to those of the resins described above, but they need not be coagulated prior to isolation and functionalization. A preferred method of preparing the weakly acidic resins of this invention involves adding a crosslinked acrylic ester emulsion copolymer to an alkali hydroxide solution. Upon addition the emulsion may coagulate, but as the copolymer ester linkages are hydrolyzed to form carboxylic acid groups in the salt form, any coagulum formed re-suspends to form an emulsion of the salt of the functionalized resin. The functional groups of the resin may then be converted to the free acid form by treating the emulsion with a conventional, strongly acidic cationic exchange resin in the free acid form.

The emulsion copolymer ion exchange resins of this invention possess the following advantageous properties:

(a) regular, generally spherical shape,
(b) a high degree of structural rigidity which is controllable by the degree of crosslinking in the emulsion copolymer,
(c) a controllable, small particle size, the median value of which may be varied from about 0.01 to about 1.5 micrometers,
(d) a narrow particle size range, photomicrographic analysis shows ranges typically +9 nanometers of the particle median diameter for about 80% of the particles,
(e) a large surface area per unit weight, variable with particle diameter from about 4 square meters per gram to as great as about 120 square meters per gram, compared with about 0.1 square meter per gram for typical, small-diameter conventional ion exchange resins,
(f) a high degree of ion exchange functionality, variable to greater than one functional group per monomer unit,
(g) the ability to form essentially non-settling emulsions, except in the largest particle sizes,
(h) a particle size increase on hydration, controlled by the degree of crosslinking in the emulsion copolymer, which is variable from about 10% to about 500% or more of the dry particle diameter, (i) water insolubility and negligible water extractability, and desirable sensible properties of
(j) subdued taste,
(k) ability to mask the taste of materials bound to the resin,
(l) a smooth, non-gritty texture to the mouth, and
(m) a smooth, non-irritating texture to the skin.

The emulsion copolymers from which the ion exchange resin of this invention are derived may be prepared by conventional emulsion polymerization techniques. These techniques typically involve, but are not limited to, polymerization of an emulsion comprising the monomers and a surface-active agent. The polymerization is usually initiated by a water-soluble initiator. It is well known that the action of most such initiators is inhibited by the presence of oxygen, so oxygen-excluding techniques, such as using inert gas atmosphere and deoxygenated solutions and emulsions, are preferably employed in the polymerization. The choice of surface-active agents and initiators will be apparent to one skilled in this art. The monomers from which the emulsion copolymers are derived comprise a major amount of a monoethylenically unsaturated monomer or mixture of such monomers and a minor amount of a polyethylenically unsaturated monomer or mixture of such monomers which act to crosslink the polymer. The following are examples of monoethylenically unsaturated monomers useful in preparing the emulsion copolymers: aromatic monomers, including polycyclic aromatic monomers such as vinylnaphthalenes and monocyclic aromatic monomers such as styrene and substituted styrenes, which include ethylvinylbenzene, vinyltoluene and vinylbenzyl chloride; and acrylic monomers, the esters of methacrylic and acrylic acid, such as methyl acrylate, ethyl acrylate, propyl acrylate, isopropyl acrylate, butyl acrylate, tert-butyl acrylate, ethylhexyl acrylate, cyclohexyl acrylate, isobornyl acrylate, benzyl acrylate, phenyl acrylate, alkylphenyl acrylate, ethoxymethyl acrylate, ethoxyethyl acrylate, ethoxypropyl acrylate, propoxymethyl acrylate, propoxyethyl acrylate, propoxypropyl acrylate, ethoxyphenyl acrylate, ethoxybenzyl acrylate, and the corresponding methacrylic acid esters.

In the case of the acrylic esters, the preferred embodiment employes lower aliphatic esters of acrylic acid in which the aliphatic group contains from 1 to 5 carbon atoms. This is a particularly preferred embodiment when the copolymers therefrom are to be employed as intermediates in the preparation of either carboxylic cation-exchange emulsion copolymer resins or anion-exchange emulsion copolymer resins. In the preparation of both the carboxylic exchanger and the anion exchanger, the ester group is replaced. Thus, the practical choice is methyl or ethyl acrylate.

Suitable polyunsaturated cross-linking monomers include the following: divinylbenzene, divinylpyridine, divinyltoluenes, divinylnaphthalenes, ethylene glycol dimethacrylate, divinylxylene, divinylethylbenzene, divinylsulfone, divinylketone, divinylsulfide, trivinylbenzene, trivinylnaphthalene, trimethylolpropane trimethacrylate, polyvinylanthracenes and the polyvinylethers of glycol, glycerol, pentaerythritol, and resorcinol. Particularly preferred cross-linking monomers include the following: polyvinylaromatic hydrocarbons such as divinylbenzene and trivinylbenzene, glycol dimethacrylates such as ethylene glycol dimethacrylate, and polyvinyl ethers of polyhydric alcohols, such as divinoxyethane and trivinoxypropane. Aqueous emulsion polymerization of mixtures of ethylenically unsaturated monomers are described in U.S. Pat. Nos. 2,753,318 and 2,918,391, among others.

As noted above, emulsion copolymer ion exchange resins of this invention may be prepared with median particle diameters from about 0.01 to about 1.5 micrometers; they may also be prepared in a range of preferred median particle diameters from about 0.01 to about 0.5 micrometers. The median particle diameter of the resin may be accurately controlled within these ranges, and the distribution of particle diameters about the median value is narrow, far narrower than distributions obtained with comminuted resins of small particle diameter. Control of the resin particle diameter depends on the emulsion copolymer, even though the particle size is increased by functionalization. Such control of the emulsion copolymer particle diameter is well known. For example, within the copolymer particle diameter range of about 0.05 to about 0.3 micrometers the size may be controlled by varying the level of surface active agents present in the polymerization mixture, an increase in these agents tending to produce a smaller emulsion copolymer particle. Crosslinker levels in the polymer tend also to exert an effect on copolymer particle diameter; more highly crosslinked copolymer particles tend not to swell as much when they hydrate as lightly crosslinked particles. Below diameters of about 0.1 micrometers special surface active agents may be used to control particle size down to about 0.01 micrometers as illustrated below in Example 14. Copolymer particles larger than about 0.3 micrometers may be formed by further reduction of the level of surface active agents, or by growing larger particles from "seed" particles of pre-formed emulsion copolymers. Polymer particles may be formed in this way to as large as about 1 micrometer in diameter; subsequent functionalization produced ion exchange resin particles with diameters as large as about 1.5 micrometers. The process of making large copolymer particles is illustrated below in Example 13.

Crosslinker levels may be selected between about 0.1% and about 25%, a more preferred range being from about 1% to about 20%. Selection of crosslinker levels depends upon the particular type of resin, physical properties, and the level of functionality desired in the emulsion ion exchange resin product. For example, sulfonic acid functionalized resins are prepared from emulsion copolymers with higher levels of crosslinker than copolymers for preparing amine functionalized resins. Similarly, if very low swelling is desired, a processing advantage that permits the use of smaller reaction containers, higher crosslinker levels are used. Ranges of about 3% to about 12% crosslinker are typical for sulfonic acid functionalized resins with low swelling properties, and higher levels may be used when exceptionally low swelling is desired. Levels above about 25% may be employed for special purposes, so long as the crosslinker, as well as the monoethylenically unsaturated monomer, may be functionalized to produce a reasonable number of functional groups per monomer unit. Where more rapid kinetics are desired, lower crosslinker levels are selected. While anion exchange emulsion resins preferably contain crosslinker levels between about 0.1% and about 7% or higher, they more preferably contain from about 0.5% to about 3% crosslinker. The selection of specific crosslinker levels to produce the desired balance of physical properties is well known to those skilled with conventional ion exchange resins, and the same guiding principles are used with emulsion resins.

To permit further handling, the emulsion copolymer is coagulated using one of several well-known procedures. A preferred coagulation procedure is to add the emulsion to a hot saline solution; aqueous solutions at concentrations from saturated to about 2% (wt) sodium chloride or other inorganic salts such as calcium chloride, aluminum sulfate and others may be used. Aqueous sulfuric acid solutions, concentrated to about 4% (wt), are also suitable, and aqueous alkali hydroxide solutions such as those of potassium or sodium hydroxide are especially suitable for coagulation and simultaneous hydrolysis and functionalization of acrylic ester copolymers. Addition of the emulsion to the stirred coagulant solution allows the coagulum to disperse as particles with size dependent upon the stirring rate; the useful size spans a wide range but for easiest handling should not fall below small granules into the powder range.

Addition of the coagulant solution to the emulsion is possible, but tends to produce an unwieldy coagulated mass rather than coagulum particles. The emulsion may also be coagulated by drying it; spray drying is a preferred procedure for the preparation of strongly basic resin product from an aromatic copolymer; the particles produced by this procedure tend to be too small for efficient handling when used for functionalization reactions that require subsequent filtration and washing. Other useful procedures for coagulating the copolymer emulsion include vigorous stirring, alternating freezing and thawing, and addition of an organic solvent to the emulsion.

Once produced, the coagulum particles are coherent enough to withstand typical handling techniques used in the washing, filtration, and functionalization of conventional, suspension-polymerized ion exchange beads. The coagulum is preferably freed from water by evaporation at ambient or higher temperatures, or by rinsing with a water-miscible, dry, organic solvent, to prepare it for convention functionalization reactions.

In general the reactions employed to functionalize emulsion copolymer ion exchange resins are the same as those used to produce ion exchange resins from conventional, suspension-polymerized copolymers. As a high degree of funtionalization is desirable because it produces a large number of functional ion exchange sites per unit weight of resin, the emulsion ion exchange resins of the present invention are functionalized to between about 0.7 and about 1.5 functional groups per monomer unit. The more preferred range is from about 0.8 to about 1.2 functional groups per monomer unit. The term, "functional groups per monomer unit", as used herein, refers to the number of ion exchange functional groups per total monomer units, both "backbone", monoethylenically unsaturated monomer and crosslinking, polyethylenically unsaturated monomer. For example, in the case of an aromatic backbone monomer and aromatic crosslinker monomer used to prepare a copolymer, this term would refer to the number of functional groups per aromatic ring in the polymer. Similarly, in the case of a copolymer with a functionalized acrylic backbone and an unfunctionalized aromatic crosslinker, the degree of functionalization will be the functional ion exchange groups per total monomer units, both acrylic and aromatic. The degree of functionalization may be thought of as the number of functional groups per mole of all the monomers which constitute the copolymer. Some of the typical processes for functionalizing the copolymer are illustrated below.

Strongly acidic emulsion copolymer ion exchange resins of this invention may be prepared, for example, by heating coagulum particles of crosslinked styrene or substituted styrene emulsion copolymer with concentrated sulfuric acid to produce a sulfonic acid-functionalized resin, rinsing the product free of excess acid with water, and re-suspending the coagulated emulsion particles by the processes described above.

Weakly acidic emulsion copolymer ion exchange resins of this invention may be prepared, for example, by hydrolyzing crosslinked acrylic ester emulsion copolymers with alkali metal hydroxide solutions, to form carboxylic acid-functionalized resins. It should be noted that this particular procedure does not require that the emulsion be coagulated prior to functionalization; upon addition of the emulsion to the hydroxide solution coagulation may occur, but as the ester linkages are hydrolyzed any coagulum of the copolymer resin re-suspends. The carboxylic acid-functionalized resin produced by this procedure is in the alkali metal form, and may be converted to the free acid (hydrogen) form by contacting it with a conventional, strongly acidic cation resin in the hydrogen form. Similarly, acrylic ester copolymer resins may be hydrolyzed with strong acids to produce carboxylic acid-functionalized resins in the hydrogen form, but in this case the product is a coagulum rather than an emulsion.

Strongly basic emulsion copolymer ion exchange resins of this invention may be prepared, for example, by chloromethylating coagulated particles of crosslinked styrene emulsion copolymer with chloromethyl methyl ether in the presence of a Lewis acid such as aluminum chloride, and treating the resulting intermediate emulsion copolymer material with a tertiary amine such as trimethylamine to form a quaternary amine chloride functional group. Alternatively, a strongly basic quaternary amine resin may be prepared by treating a crosslinked acrylic ester emulsion copolymer with a diamine containing both a tertiary amine group and a primary or secondary amine group, such as dimethylaminopropylamine or di(3-dimethylaminopropyl)amine, and quaternizing the resulting weakly basic resin with an alkyl halide such as methyl chloride.

Weakly basic emulsion copolymer ion exchange resins of this invention are prepared, for example, in the same manner described for strongly basic resins, except that for a styrene copolymer primary or secondary amines are employed instead of tertiary amines, and for an acrylic ester copolymer the resin is not quaternized with an alkyl halide.

While the functionalized coagulum particles possess ion exchange properties, and are sufficiently cohesive that they may be used in conventional ion exchange processes in much the same manner as conventional resin beads, a preferred form for utilizing the materials of this invention is the re-suspended form. Re-suspension of the functionalized coagulated particles may be achieved by the processes described above, i.e., by high-shear mixing, ultrasonic vibration, mild grinding, or other comminuting method which disrupts the coagulum without damaging the spherical resin particles. Spontaneous resuspension of the emulsion particles occurs during preparation of the strongly basic product from aromatic copolymers under some conditions, eliminating the need for a comminuting step.

It should be noted that the hydrophobic nature of the unfunctionalized emulsion copolymer particles encourages coagulation. Once functionalized the ion exchange resin particles are relatively hydrophilic; they tend not to coagulate from emulsion form under the conditions suggested for the unfunctionalized copolymer emulsions. Photomicrographic and other physical evidence indicates that the emulsions of the functionalized ion exchange resin particles tend to contain largely individual particles. On drying a sample of such an emulsion the particles may remain as individual particles, or they may form small, loosely bound clusters of particles. These clusters may be disrupted by very mild force—rubbing between the fingers is often sufficient—in contrast to the tightly bound nature of the coagula. The loose clusters also tend to disperse spontaneously upon addition to water, to form emulsions of the individual resin particles.

In general, the emulsion copolymer ion exchange resins of this invention may be used in any application where ground ion exchange resins, produced by bulk or suspension polymerization, are used, but because of the special properties of the resins of this invention, they often prove superior to ground resins. In addition, these special properties permit resins of this invention to be used for a wide variety of applications where ground resins are unsuitable.

Among the uses for the resins of this invention are those as orally administered medicines or medical treatments. These include the use of the weakly acidic resins in the calcium or magnesium form as gastric antacids, of the strongly acidic resins in the sodium form in treating hyperkalemia, of the strongly acidic resins in the calcium form or the strongly basic resins in the chloride form in treating hypercholesterolemia, and of the weakly acidic resins in the calcium form in treating gallstones. Further such uses are as drug carriers and sustained release agents for drugs and other materials; in this application and others an added advantage is the masking of objectionable flavors or odors of the absorbed materials. The resins may further be used in the treatment of acute poisoning, such as by heavy metals, drugs, and the endotoxins, exotoxins, enterotoxins and the like of micro-organisms. Other uses in the area of internal medicine include removal of pyrogens from materials which would come into contact with the blood, removal of micro-organisms from the stomach and intestines, and use as an injectable contrast medium for radiography.

Further uses of the resins of this invention are in the area of external medicines and medical treatments. These include use as pH control agents, for the treatment of contact dermatitis caused by poison ivy or other agents, as anti-perspirants, deodorants, and skin microbiocides, as anti-irritants either for this property alone or while also serving as a drug carrier, and in the treatment of bites or stings from insects, arachnids, snakes and the like.

Domestic and industrial uses of the resins of this invention are in the areas of flocculation, filtration and deionization. Combining the strongly acidic resins in the hydrogen form with the strongly basic resins in the hydroxyl form produces a floc which may be used as a filtration and deionization medium for condensate water, or as a flocculant and filtration aid for fermentation broths. The strongly basic or weakly basic resins may be used to remove free acids from edible oils and for decolorizing crude sugars and molasses. The strongly basic and weakly basic resins may be used to remove fulvic and humic acids from potable water, and to bind and remove micro-organisms from such water. The floc formed by combining weakly acidic and weakly basic resins may be used for deionization of water, crude sugars and the like. The floc formed by combining strongly basic and strongly acidic resins may be used for demineralization of process fluids, crude sugars, whey, and the like.

Further uses for the resins of this invention are as additives to paper and nonwoven textile materials. They may be incorporated into disposable diapers and sanitary napkins as deodorants and anti-bacterial agents. They also serve as dye acceptors for incorporation into paper, textiles and paints; in this application they may also be blended into polymers prior to fiber extrusion.

Further uses for the resins of this invention are as formulating aids for agricultural products. They may serve as controlled-release substrates for biologically active materials, including pesticides, fertilizers, growth hormones, minerals and the like, as suspension aids for pesticide formulations and similar applications where their emulsifiability and ion exchange activity are desirable, and as pH control agents.

Still further uses for the resins of this invention are in the area of catalysis and scavenging. They may serve as high-surface-area, heterogeneous acid or base catalysts, for example, in the conversion of cumene hydroperoxide to phenol and acetone, as an acid acceptor, for example, in the synthesis of ampicillin, and as a scavenger for products, by-products or metabolites to shift reaction equilibria toward completion. They may serve as enzyme activators, for example, in fructose conversion, and as substrates for immobilizing enzymes. The dry resins may be used as desiccants for organic solvents.

Miscellaneous uses for the resins of this invention include use of the weakly acidic resins in synthetic detergents as sequestering agents and replacements for phosphate builders; use, especially of the weakly acidic resins in the potassium form, as tablet disintegrating agents; and use as extractants in hydrometallurgy, for the recovery of germanium, uranium, zinc and the like. The small size of the resins allows their use in ultrafiltration applications within the lumens of fine hollow fibers. They may be used as ion exchangers or adsorbents for removing metals or metal porphyrins from petroleum residues. They may be used as high-surface-area extractants for the purification of organic acids such as lactic, citric, tartric and similar acids produced by fermentation. They may be used to remove proteins and amino acids from the waste water of sugar refineries, slaughter houses and the like, and the resulting loaded resins, because of their pleasant mouth feel and lack of taste, may be fed directly to domestic animals such as cattle.

Sugar decolorization and clarification using emulsion ion exchange resins of the present invention offers significant advantages over conventional processes. Conventionally raw sugar solutions are treated with regenerable adsorbents such as bone char, activated carbon, or conventional ion exchange resins. These adsorbents require chemical regenerants or heat for regeneration, and produce undesirably dilute sugar solutions. In most refineries several decolorization operations follow the clarification operations, often including a sulfur dioxide bleach, addition of non-recoverable powdered carbon, or use of a flocculating agent. The emulsion resins of the present invention permit a single-step decolorization and clarification. When added to impure sugar solutions they form coherent, filterable flocs with the charged particulate impurities usually present in such solutions. Although the resin particles are incorporated into the floc, they retain their ion exchange functionality, and therefore removed dissolved ionic impurites and color-imparting impurities from the solutions. They further remove particulate and color-imparting impurities either by co-precipitation during the formation of the floc, or by retaining such impurities during filtration of the floc-containing solution. Yet another mechanism by which the flocs remove impurities from the solutions is adsorption onto the particles which comprise the flocs; being extremely small, these particles contribute high surface area to the flocs. By one or more of these mechanisms the emulsion ion exchange resins of this invention remove from the sugar solutions the impurities which impart color and lack of clarity, and additionally salts and the precursors to the color impurities. The flocs containing adsorbed and entrained impurities may be removed from the sugar solution by filtration, flotation or other known processes. The sugars which may be treated include cane, corn, beet and other sugars. The excellent kinetics of these emulsion resins, resulting from their fine particle size, allow them to act far more rapidly as ion exchangers then the conventional ion exchange resins heretofore employed, and the flocs themselves have the added advantage of acting as a filter aid. The use of the emulsion resins of this invention for decolorizing and clarifying sugar solutions is illustrated in Example 27 below.

In those cases where insufficient charged particulate impurities are present in the impure sugar solution to incorporate all of the added emulsion resin into the floc, a separate flocculating agent may be added to the solution. Such flocculating agents include both ionic surface-active agents having a charge opposite that of the emulsion resin, nonionic surface-active agents and finely divided ion exchange materials having a charge opposite that of the emulsion resin. These ion exchange materials may be ground conventional resins or emulsion resins.

While the preferred emulsion resins for sugar decolorization and clarification are anion exchange emulsion resins and the strongly basic anion exchange emulsion resins are most preferred, acidic, cation exchange emulsion resins may also be used to treat sugars, and especially to treat sucrose for the purpose of inverting it. Inversion, the process of hydrolyzing the 12-carbon sucrose to a mixture of the 6-carbon sugars, glucose and fructose, occurs in the presence of certain enzymes or of hydrogen ions. Strongly acidic emulsion cation exchange resins may be used to supply these hydrogen ions without introducing undesirable soluble anions into the sugar. Following inversion the cation exchange emulsion resin may be removed from the invert sugar solution with a conventional flocculating agent or by addition of an anion exchange emulsion resin such as a strongly basic emulsion resin. When such an emulsion resin is used, it tends to further clarify and decolorize the sugar solution, and the floc which forms acts as a filtration aid. The advantage of such a process over conventional treatment of sucrose solutions in a bed of cation exchange resin beads is that a more concentrated, hence more viscous, solution may be treated with the emulsion resin than with the bead resins.

As noted above, combining a cationic emulsion copolymer resin with an anionic emulsion copolymer resin allows the oppositely charged particles of the two types of resins to interact and form a loose, electrostatically bound floc. The floc has excellent kinetic properties for ion exchange because liquids readily penetrate it, and because the individual particles themselves are so small that they are readily penetrated. The floc is readily disrupted by shear forces, but because the electrostatic attraction of the oppositely charged particles remains, the floc re-forms when the shear force is removed. Because of this the floc may be pumped by conventional, liquid-handling pumps as though it were a liquid. It may also be supported on relatively coarse, low-pressure-drop filter screens where the electrostatic attraction minimizes particle sloughage during use. In addition to the deionization properties, these flocs have excellent filtration properties, as shown by Example 25 below. The deionization and filtration properties of these flocs may be utilized simultaneously, as when removing ions and particulate matter from steam generator condensate water. In such an application the floc is usually pre-coated onto the filter cloth, filter screen, filter leaf or other mechanical filter means. The floc may be pre-formed by mixing the cationic and anionic copolymer resin emulsions prior to transferring it to the filter itself, or the floc may be prepared in the liquid to be treated and filtered by adding emulsions of the cationic and anionic emulsion copolymer resins to the liquid. In this latter case, entrainment of particulate matter within the floc as it forms may be an additional advantage. The flocs described herein may be prepared by mixing strongly acidic emulsion copolymer resins with strongly basic or weakly basic emulsion copolymer resins and weakly acidic emulsion copolymer resins with strongly basic or weakly basic emulsion copolymer resins. They may be formed by mixing particles of one or more cationic emulsion resins with particles of one or more anionic resins; weakly acidic and strongly acidic emulsion resins may be mixed, as may weakly basic and strongly basic emulsion resins, and these mixtures may be used to form flocs. Emulsion resins having different particle sizes may be mixed to form flocs, including a multiplicity of cationic emulsion resins having different sizes, or a multiplicity of anionic emulsion resins having different sizes; such mixtures are used to control the texture, and hence the filtering and other handling characteristics, of the flocs. The formation of flocs is illustrated in Examples 22 and 23 below.

Flocs prepared from weakly acidic and weakly basic emulsion resins have the additional useful property of being thermally regenerable. That is, the floc may be used to remove anions and cations from a relatively cold liquid, and these anions and cations may be replaced with hydrogen and hydroxyl ions from a relatively hot aqueous liquid during regeneration. Such flocs differ from conventional thermally regenerable resins which are usually large, hard beads containing areas of both acidic and basic functionality. Because the thermally regenerable floc can form a large, coherent mass, it may be used with moving-bed deionization equipment. In such equipment the floc is coated on a moving filter support which continuously transports the floc through a deionization section, where it contacts the cold liquid being treated, and through a regeneration section, where it contacts a hot, aqueous regeneration liquid. It may similarly be used in continuous-deionization processes in which the floc is circulated by pumping through a deionization vessel and a regeneration vessel, the floc moving through the deionization vessel in a direction opposite to the flow of treated liquid. The thermal regenerability of the weak acid-weak base floc at two different pH values, and a comparison of its thermal capacity with that of a conventional thermally regenerable bead resin is illustrated in Example 24 below.

In the formation of flocs upon mixing cationic and anionic emulsion resin materials, a single particle establishes an electrostatic attraction for more than one particle of opposite charge. Especially where larger particles of one charge, as for instance particles between about 0.7 and about 1.5 micrometer in diameter, are mixed with fine particles, as for instance those with diameters smaller than 0.1 micrometer, of the opposite charge, many fine particles may cluster about the large particles. As a result the ratio of cationic emulsion resin to anionic emulsion resin in flocs may be varied over a wide range by adjusting particle sizes. Flocs may be prepared with the cationic resin to anionic resin ratio ranging from about 9:1 to about 1:9. Even in the case of particles of opposite charges having approximately the same diameter the cationic resin to anionic resin ratio may be varied over at least the range from about 3:2 to about 2:3; this is a preferred range, regardless of diameter. A more preferred ratio of cationic resin to anionic resin is about 1:1.

The emulsion copolymer ion exchange resins of this invention may be changed from one ionic form to another by contacting them with conventional ion exchange resins, that is, with ion exchange resins having particle sizes of about 40 micrometers or larger, and preferably those resins suited for use in conventional ion exchange beds. Particles of ion exchange resin having diameters of about 40 micrometers or greater are referred to herein as "macrobeads", regardless of whether they are spherical beads or of other geometric shapes. For example, an emulsion anion exchange resin prepared in the chloride form may be changed to the hydroxyl form by passing an emulsion of the resin through a conventional bed of strongly basic anion exchange resin in the hydroxyl form. Chloride ions of the emulsion resin are exchanged for hydroxyl ions of the conventional large-bead resin as the emulsion resin passes through the column. Because the ions are exchanged by each resin, the ionic form of the conventional resin is also changed. This process may therefore be used to change the ionic form of the emulsion resin to a desired form, or to change the resins of fixed beds to a desired ionic form, as in ion exchange bed regeneration. Individual or mixed emulsion resins, and individual or mixed conventional resins, may be employed in this process. The emulsion resins are preferably of the same ion exchange type as the conventional resins; "ion exchange type" as used herein meaning the ionic type of the ion exchange functional groups: either substantially cationic (acidic) or substantially anionic (basic).

Ion exchange will occur between such resins both in a batch process, where the exchange is allowed to reach equilibrium, and in a column or bed process, where continuous equilibration produces a high conversion to the desired ionic form, just as it does in conventional treatment of ionized solutions with ion exchange beds. This process is illustrated in Examples 8, 19 and 21, below.

The following examples are intended to illustrate, and not to limit, the invention. All percentages used herein are by weight unless otherwise specified, and all reagents are of good commercial quality.

EXAMPLE 1

This example illustrates the preparation of a styrene-divinylbenzene emulsion copolymer. A monomer emulsion is prepared by stirring vigorously under a nitrogen atmosphere 370 g of deoxygenated water, 48.2 g of Triton X-200 (trademark of Rohm and Haas Company, Philadelphia, Pennsylvania, for the sodium salt of an alkyl aryl polyether sulfonate surface-active agent containing 28% solids), 348.8 g of styrene and 51.2 g of commercial-grade divinylbenzene (54.7% divinylbenzene, balance essentially ethylvinylbenzene). An aqueous initiator solution is prepared by dissolving 2.0 g of potassium persulfate in 100 g of deoxygenated water, and 50 g of the monomer solution is added to the initiator solution. The mixture is stirred to develop a 1-inch vortex and is heated to 70° C. under the nitrogen atmosphere. When polymerization begins, as evidenced by a sudden decrease in opacity, the remaining monomer emulsion is added over a period of 1.5 hours. The temperature is held at 70° C. for one hour after the addition is completed. The polymer emulsion is cooled to room temperature and filtered through cheesecloth. The measured solids content of the emulsion is 43.0%, versus a calculated value of 45%.

EXAMPLE 2

This example illustrates the brine coagulation of the polymer emulsion prepared in Example 1. A 1400-ml quantity of 25% aqueous sodium chloride solution is heated to 100° C. While stirring the solution, 700 ml of the emulsion prepared in Example 1 are added at as rapid a rate as is possible without the solution temperature falling below 95° C. The solution temperature is held at 100°–103° C. for 30 minutes, and the solid coagulum is filtered out on a USA Standard Series 150 $\mu$m (alternative designation No. 100) sieve. The coagulum is rinsed with water and dried overnight at 110° C.; the yield after drying is 292.1 g.

EXAMPLE 3

This example illustrates the sulfuric acid coagulation of the polymer emulsion prepared in Example 1. To 250 ml of stirred, concentrated sulfuric acid, 41 ml of the polymer emulsion of Example 1 are added through a Pasteur pipette with its tip beneath the surface of the acid. The resulting vermiform coagulum is about 1.5 mm in diameter and 5–7 mm long.

EXAMPLE 4

This example illustrates the sulfonation of the coagulum of Example 2 to form a strongly acidic cation exchange material. A 20-g quantity of the dry coagulum from Example 2 is mixed with 120 ml of concentrated sulfuric acid and heated under nitrogen atmosphere with stirring to 120° C.; it is held at this temperature for 5 hours. The reaction mixture is allowed to cool, and water is added as rapidly as possible without allowing the temperature to rise above 95° C. The solid material is allowed to settle, and the supernatant liquid is removed. About 120 ml of water are added to the solid material and then removed. The solid material is transferred to a filter tube, rinsed with water and drained; the yield is 103.8 g of material with 31.7% solids. The cation exchange capacity of this material is 5.22 milliequivalents per gram of the material in dry, $H^+$ form, compared with 5.26 meq/g theoretical.

It should be noted that theoretical ion exchange capacity and theoretical degree of functionalization, as used herein, is based upon the assumption of one functional group per aromatic ring (styrene resins) or per monomer unit (acrylic resins). Since this value may be exceeded under certain conditions, measured values greater than "theoretical" may occur.

EXAMPLE 5

This example illustrates the chloromethylation and aminolysis of the coagulum from Example 2. A 20-g sample of the dry coagulum from Example 2 is swelled in a mixture of 17 ml of chloromethyl methyl ether and 69 ml of propylene dichloride. While stirring this slurry a solution of 19 g of aluminum chloride in 25 ml of chloromethyl methyl ether is added slowly with cooling, keeping the temperature at 32° C. or less throughout the addition. The reaction mixture is held at 32° C. for 2 hours and then is cooled to 15° C. Water is added dropwise with cooling, keeping the temperature to 30° C. or less. The aqueous layer is decanted from the swollen organic layer and the product is washed twice with water, once with 4% aqueous sodium hydroxide solution, and once again with water. The solid product is filtered; its weight while still wet with propylene chloride is 105 g. A 15-g sample of this chloromethylated intermediate is slurried with water containing 40 mg of 1200-molecular-weight poly(ethyleneimine). The mixture is heated and the propylene chloride stripped out. The mixture is cooled and 9 ml of 25% trimethylamine are added. The temperature of the mixture is raised to 70° C., held constant for 5 hours, and raised to 95° C. to strip out the excess trimethylamine. The resulting solid is transferred to a filter tube, rinsed with water and drained; the yield is 14.6 g of material with a solids content of 35.9%. The anion exchange capacity of this material is 3.64 meq/g of dry material in the chloride form. Microanalysis shows it to have the following composition:

C—67.16%
H—8.49%
O—6.82%
N—4.82%
Cl—12.37%
(corrected for $O=H_2O$)
$N=3.7$ meq/g.
$Cl=3.8$ meq/g.

EXAMPLE 6

This example illustrates the aminolysis of a vinylbenzyl chloride-divinylbenzene emulsion copolymer coagulum. An emulsion copolymer of vinylbenzyl chloride and divinylbenzene (commercial grade, containing 54.7% divinylbenzene and the balance essentially ethylvinylbenzene) is prepared according to the procedure of Example 15 below; the copolymer contains 8% divinylbenzene and has a measured solids content of 29.6%. The emulsion copolymer is allowed to stand until it coagulates, and 50 g of the coagulum are slurried with a solution of 0.15 g of 1200-molecular weight poly(ethyleneimine) in 100 ml of water. The slurry is heated to 60° C., held at that temperature for one hour, and transferred to a pressure reactor. To the reactor 40 g of 40% dimethylamine and 5.4 g of 50% aqueous sodium hydroxide solution are added. The mixture is stirred and heated to 60° C., held at that temperature for one hour, then heated to 87° C. and held at that temperature for 4 hours. The reactor is cooled and purged with nitrogen, and the reaction mixture is filtered. The solids are rinsed with water and drained; microanalysis of a small, dried sample of the solids shows the following values:

C—81.59%
H—9.00%
O—2.52%
$N=6.57\%$
(results are corrected for $O=H_2O$).
$N=4.8$ meq/g, as compared to a theoretical value of 5.3 meq/g.

EXAMPLE 7

This example illustrates the preparation of a methyl acrylate-divinylbenzene emulsion copolymer. A dispersion of 24 g of Triton X-200 in 360 g of deoxygenated water is prepared under a nitrogen atmosphere in a 1-liter, round-bottomed flask, and is stirred to create a 1-inch vortex. A mixture of 29 g of divinylbenzene (commercial grade containing 55.2% divinylbenzene and the balance essentially ethylvinylbenzene) and 171 g of methylacrylate is added to the aqueous dispersion, followed by 4 ml of freshly prepared, 820 ppm ferrous sulfate solution and 50 ml of deoxygenated water containing 1.0 g of ammonium persulfate solution. This mixture is stirred for about 15 minutes and cooled to 20° C. A solution of 1.0 g of sodium metabisulfite in 20 ml of water and 5 drops of 70% t-butyl hydroperoxide are added to the mixture. After a 5-minute induction period the temperature is observed to rise to 80° C. during a period of 6 minutes, and thereafter to fall slowly. After 30 minutes, the mixture is cooled to room temperature and filtered through cheesecloth. The solids content of the filtered emulsion is determined to be 31.0%, as compared to a theoretical value of 31.4%.

EXAMPLE 8

This example illustrates the hydrolysis and resuspension of the methylacrylate-divinylbenzene copolymer of Example 7 to produce a weak-acid-functionalized ion exchange resin emulsion. A 200-g sample of the emulsion produced in Example 7 is added to a stirred solution of 57.4 g of 50% aqueous sodium hydroxide solution in 250 ml of water—this represents a 20% excess of base—and the emulsion is observed to coagulate. This mixture is heated to 93° C., held at that temperature for 2 hours, and cooled to room temperature. The coagulum is observed to re-suspend in the sodium hydroxide solution during the stirring and heating period. The emulsion product is diluted to 800-850 ml with water and is passed through a column of Amberlite IR-120 cation exchange resin (trademark of Rohm and Haas Company, Philadelphia, Pennsylvania, for a sulfonic acid functionalized, styrene/divinylbenzene gel cation exchange bead resin) in the $H^+$ form to remove the excess sodium hydroxide and convert the product to the free acid form. The solids content of the resulting emulsion is 4.74%, and the weak acid cation exchange capacity is 9.4 meq/g of dry polymer.

EXAMPLE 9

This example illustrates resuspension of the functionalized emulsion copolymer coagula prepared in preceeding examples. The functionalized coagulum is transferred to a high-speed blender container (minibottle assembly of a Waring Blendor, model 7011-31 BL 41) and just covered with water. The blender is operated at high or low speed for one-half minute to twenty minutes, as required to re-suspend the emulsion.

EXAMPLE 10

This example illustrates the aminolysis and resuspension of the emulsion copolymer coagulum prepared as described in Example 6. A 17-g sample of the coagulum is slurried in 125 ml of water and 9.0 g of anhydrous trimethylamine are added. The temperature is observed to rise to 33° C.; the slurry is further heated to 65° C., and the excess trimethylamine is swept off with a nitrogen gas stream. The resulting product, although very thick, is fully suspended. The solids content of the emulsion is 16.3%.

EXAMPLE 11

The particle-size distribution of a sample of the OH$^-$ form of a strongly basic, emulsion copolymer ion exchange resin, prepared as described in Examples 1, 2 and 5 by aminating a chloromethylated styrene-7% divinylbenzene emulsion copolymer with trimethylamine, is measured by electron photomicrography. The mean particle diameter is 147 nanometers (1 micrometer=1000 nanometers), approximately 76% of the particle diameters fall within a 18-nanometer range, and approximately 95% of the particle diameters fall within a 33-nanometer range.

EXAMPLE 12

The particle size distribution of a sample of weakly acidic, carboxylic acid functionalized, acrylate emulsion copolymer ion exchange resin containing 8% divinylbenzene, in the H$^+$ form, prepared as described in Examples 7 and 8, is measured by electron photomicrography. The mean particle diameter is 48 nanometers, approximately 84% of the particle diameters fall within a 19-nanometer range, and approximately 95% of the particle diameters fall within a 29-nanometer range.

EXAMPLE 13

This example illustrates the preparation of a styrene-divinylbenzene emulsion copolymer having a particle size larger than 0.5 μm by a process which involves adding the monomer solution to a pre-formed copolymer emulsion for polymerization. A monomer emulsion is prepared by stirring vigorously under a nitrogen atmosphere 180 g of deoxygenated water, 14.3 g of Triton X-200, 377.8 g of styrene, 22.2 g of divinylbenzene (54% divinylbenzene, balance largely ethylvinylbenzene) and 0.8 g of ammonium persulfate. Under a nitrogen atmosphere in a separate container 348 g of deoxygenated water is stirred to develop a 1-inch vortex and is heated to 95° C. To this 13 g of a previously prepared emulsion copolymer is added, followed by 1.2 g of ammonium persulfate. (The previously prepared emulsion copolymer is a 3% divinylbenzenestyrene emulsion copolymer containing 43.3% solids, previously prepared according to the method of Example 1 and having a particle size of approximately 0.1 μm.) The mixture is stirred for 30 seconds and the monomer emulsion prepared above is added dropwise during a 3.5-hour period; the temperature is maintained at about 90° C. When the addition is complete the temperature is maintained at 90° C. for 30 minutes, after which 33.7 g of TRITON X-200 is added. The emulsion is cooled to room temperature and filtered through cheesecloth. The measured solids content is 36.5% versus a calculated value of 42.4%.

EXAMPLE 14

This example illustrates the preparation of a styrene-divinylbenzene emulsion copolymer of fine particle size. A monomer emulsion is prepared by stirring vigorously under a nitrogen atmosphere 90 g of deoxygenated water, 2.73 g of Siponate DS-4 (trademark of Alcolac, Inc. for the sodium salt of dodecylbenzene sulfonic acid), 123.5 g of styrene, 72.5 g of divinylbenzene (55.2% divinylbenzene, balance largely ethylvinylbenzene) and 4.0 g of glacial methacrylic acid. Under a nitrogen atmosphere in a separate container 350 g of water, 33.09 g of Siponate DS-4, and 1.0 g of potassium persulfate are stirred and heated to 85° C. The above monomer emulsion is added dropwise during a 3.5-hour period while the temperature is maintained at 85° C. A solution of 0.4 g of potassium persulfate in 75 ml of water is added and the mixture is stirred at 85° C. for 2 hours. The product is cooled to room temperature and filtered through cheesecloth. The measured solids content is 26.0% versus a calculated value of 27.0%.

EXAMPLE 15

This example illustrates the preparation of vinylbenzyl chloride-divinylbenzene emulsion copolymer. A mixture of 1.0 g of potassium persulfate, 35.74 g of Siponate DS-4 and 350 g of deoxygenated water are stirred under a nitrogen atmosphere. A mixture of 171 g of vinylbenzyl chloride and 29 g of divinylbenzene (55.2% divinylbenzene, balance largely ethylvinylbenzene) are added. This mixture is cooled to 0°–10° C. and swept with nitrogen for 2 hours. A solution of 1.0 g of potassium persulfate in 50 g of water is added and the temperature is raised to 30° C. for 18 hours. A solution of 0.48 g of sodium bicarbonate in 20 g of water is added and the temperature is raised to 40° C. for 6–24 hours. The product is cooled to room temperature and is filtered through cheesecloth. The measured solids content is 29.6% versus a calculated value of 31.8%.

EXAMPLE 16

This example illustrates the brine coagulation of the polymer emulsion prepared in Example 7. A 40 g sample of polymer emulsion prepared in Example 7 is added to 100 ml of a stirred solution of 25% sodium chloride in water at 100° C. The temperature is maintained for 2 minutes and cooled to 50° C. The solid product is filtered and rinsed with water followed by methanol. The solids content of the water-rinsed coagulum is 50%.

EXAMPLE 17

This example illustrates the chloromethylation and aminolysis of the copolymer emulsion prepared in Example 13. A sample of the copolymer emulsion prepared in Example 13 was coagulated and dried according to the method of Example 2. A 44.4 g sample of dry coagulum is swelled in 403 ml of propylene dichloride at room temperature for 1.5 hours. The slurry is stirred and 80.5 ml of chloromethyl methyl ether is added. The mixture is cooled to 10° C. and a solution of 34.5 g of aluminum chloride in 42 ml of chloromethyl methyl ether is added dropwise over 20 minutes while the temperature is maintained at 10° C. The stirred mixture is held at 10° C. for 4 hours; it is subsequently added to 350 ml of water with sufficient cooling that the temperature never rises above 30° C. The reaction mixture is diluted with 250 ml of water, stirred for 30 minutes and the phases are permitted to separate. The aqueous phase is decanted and the organic layer is batch washed three times with water, once with 4% sodium hydroxide solution, and twice more with water. Approximately 25% of this product, 80 ml of 25% aqueous trimethylamine, 3 g of 50% sodium hydroxide solution and 120 ml of water are combined and heated to 65° C. during a 3-hour period. The temperature is then raised to about 75° C. and the propylene dichloride-water azeotrope is stripped out. The material is cooled to 50° C. and nitrogen is swept across the surface of the stirred product to remove excess trimethylamine. The polymer emulsion product is allowed to stand overnight and is decanted from any small residue of settled solid. The solids content of the product is 17%.

EXAMPLE 18

This example illustrates the aminolysis of a chloromethylated styrene-divinylbenzene copolymer coagulum prepared as described in Example 5. A 20 g sample of a 7% divinylbenzene-styrene copolymer coagulum prepared according to Example 2 is chloromethylated according to the procedure of Example 5. Approximately 20% of the propylene dichloride-swollen product, 100 ml of water, and 25 ml of 25% aqueous trimethylamine are stirred at room temperature for the two hours and heated to 65° C. for five hours. The temperature is raised to 85° C. and the propylene dichloride and excess trimethylamine are stripped out. The aminolyzed product is a solid which is filtered and rinsed with water.

EXAMPLE 19

This example illustrates the conversion of a hydrolyzed and resuspended methyl acrylate-divinylbenzene emulsion copolymer from the salt form to the free acid form by batch treatment with a strong-acid ion exchange resin. A sample of 237.7 g (0.71 eq) of a methyl acrylate-divinylbenzene copolymer emulsion prepared according to Example 7 is hydrolyzed with 250 g of 12.5% sodium hydroxide solution according to the procedure of Example 8. The resulting thick, homogeneous product is slurried with 500 ml (0.9 eq) of Amberlite IR-120 ion exchange resin (product of the Rohm and Haas Company, Philadelphia, Pa.) in the H+ form and rapidly becomes more fluid. The beads of Amberlite IR-120 ion exchange resin are filtered and rinsed with water; the combined filtrate and rinses weigh 672 g (9.17% solids, 97% of theory). Microanalysis shows the following results:
C=55.92%
H=6.18%
O=34.54%
Na=144 ppm.

EXAMPLE 20

This example illustrates the amination of the emulsion polymer coagulum prepared in Example 16. A sample of the coagulum prepared in Example 16 is dried at 110° C., and 4 g of the dry solid is heated with 15 g of bis(3-dimethylaminopropyl)amine to 230° C. for two hours. The methanol produced is swept away with a stream of nitrogen. The reaction mixture is diluted with methanol and the coagulum is filtered, rinsed with methanol and with water, and drained. The solids content of the aminated product is 40% versus 50% for the water-rinsed starting material.

EXAMPLE 21

This example illustrates the ion exchange and conversion of a strong-base-functionalized copolymer emulsion prepared according to Example 17 from the chloride form to the hydroxide form by means of column treatment with Amberlite IR-120 and Amberlite IRA-400 ion exchange resins (products of Rohm and Haas Company, Philadelphia, Pa.), in the hydrogen and hydroxyl forms respectively. A 5 ml sample of a strong-base-functionalized copolymer emulsion prepared according to Example 17 is passed through a column of 8.55 ml of Amberlite IR-120 ion exchange resin in the H+ at a rate of 0.5 bed volumes per hour; it is washed through the column with deionized water. The effluent is then passed through a column of 7.6 ml of Amberlite IRA-400 ion exchange resin in the OH− at 0.5 bed volumes per hour and is similarly washed through the column with deionized water. A total of 13.1 ml of effluent is collected. A 4 ml sample of this effluent is titrated to a pH=7 endpoint with 4.35 ml of 0.1 N hydrochloric acid. A 0.5 g sample of effluent and 0.56 ml of 0.1 N hydrochloric acid are evaporated to dryness, yielding 0.164 g of a solid material; 2.99% solids in the hydroxyl form is calculated. A titrable strong base capacity of 3.64 meq/g is calculated.

EXAMPLE 22

This example illustrates the preparation of a floc from a strong-acid-functionalized copolymer emulsion and a strong-base-functionalized copolymer emulsion. A sample of 11 ml of a 0.5%-solids suspension of a strong-base-functionalized copolymer emulsion in the hydroxide form, prepared according to Example 5, column treated with sodium hydroxide and resuspended as in Example 9, and a sample of 9 ml of a 0.5%-solids strong-acid-functionalized copolymer emulsion prepared according to Example 4 and resuspended as in Example 9 are combined and shaken. The result is a solid floc which settles, leaving a clear, supernatant liquid.

EXAMPLE 23

This example illustrates the preparation of a floc from a weak-acid-functionalized copolymer emulsion and a weak-base-functionalized copolymer emulsion. A sample of 5 ml of a 2.07% solids, weak-acid-functionalized copolymer emulsion prepared according to Example 8 and a sample of 2.5 ml of a 3.97% solids, weak-base-functionalized copolymer emulsion prepared according to Example 6 are combined and shaken. Deionized water is added and the product is a solid floc which settles, leaving a hazy supernatant liquid.

EXAMPLE 24

This example illustrates the thermal regenerability of the floc produced by combining weak acid and weak base emulsion resins. A floc is prepared according to Example 23, the quantity of weak base and weak acid resin emulsions being selected to yield 0.2 g of floc. This floc is transferred to 16 ml of water, and the pH is adjusted to 5.6 by addition of dilute acid or base, as required, with rapid mixing. Sodium chloride is added to the mixture until its concentration in the liquid phase is approximately 100 ppm, and the mixture is allowed to equilibrate at room temperature. The specific resistance is determined to be 7200 ohm-cm, equivalent to 70 ppm sodium chloride. The mixture is heated to 92° C. while stirring, and is allowed to equilibrate at that temperature. Stirring is stopped, the floc is allowed to settle while the temperature is maintained, and a portion of the supernatant liquid is transferred to a conductivity cell. This sample is allowed to cool to room temperature, and its specific resistance is determined to be 4900 ohm-cm, equivalent to 102 ppm sodium chloride. The sample of supernatant liquid is returned to the total mixture, which is then cooled to room temperature. The pH and specific resistance are measured again, and are found to be equal to the initial, room temperature values.

This procedure is repeated using a second sample of the same floc, and again using a typical, thermally regenerable, hybrid ion exchange resin, the preparation of which is described in U.S. Pat. No. 3,991,017. The measurement results for these materials are shown in the following table:

TABLE I

| Sample | pH | Specific Resistance ohm-cm (26 C.) | ppm NaCl (26 C.) | Specific Resistance ohm-cm (92 C.) | ppm NaCl (92 C) | Thermal Capacity, meq/g |
|---|---|---|---|---|---|---|
| A | 5.2 | 5500 | 86 | 3900 | 122 | 0.05 |
| B | 5.3 | 4300 | 115 | 2800 | 172 | 0.07 |

Sample A is the floc prepared as described in Example 24; Sample B is the typical, thermally regenerable, hybrid ion exchange resin.

EXAMPLE 25

This example illustrates the use of a strong acid-strong base floc for filtration of a finely divided, suspended material from water. A floc is prepared according to Example 22, the quantity of strong base and strong acid resin emulsions being selected to yield 79.5 mg of floc containing 47% cation resin and 53% anion resin. This floc is transferred to a ½-inch (1.3 cm) diameter glass tube containing a 100-mesh nylon screen. A room-temperature suspension of 300 ppb hematite (yellow iron oxides) in water is allowed to pass through the tube at a flow rate of 3.7 gpm/ft$^2$ (18 ml/minute absolute flow rate), at an inlet pressure of 25 psi (1.70 atmospheres). The pressure drop across the bed of floc and the Silting Index of the effluent are monitored with time. The determination is stopped after 630 minutes, when the pressure drop approaches the 25-psi inlet pressure, although the floc is still filtering acceptably, as indicated by the Silting Index. The results of this determination are shown in Table II below.

The Silting Index is a number determined using the Millipore Silting Index Apparatus (Millipore Catalogue No. XX6801300), and is based on the times required to deliver pre-determined volumes of liquid through a 0.45-micron Millipore filter. Silting Index is described in Federal Test Method 5350.

TABLE II

| Time, Minutes | Pressure Drop, psi | Silting Index |
|---|---|---|
| 2 | 0.7 | — |
| 5 | 0.7 | — |
| 20 | 0.9 | 1.53 |
| 30 | 1.0 | — |
| 50 | 1.2 | — |
| 70 | 1.2 | — |
| 106 | 1.3 | 1.68 |
| 160 | 1.4 | 0.81 |
| 208 | 1.5 | 1.00 |
| 255 | 1.7 | 1.17 |
| 310 | 1.8 | 1.76 |
| 350 | 2.0 | 2.09 |
| 400 | 4.4 | 3.19 |
| 440 | 7.8 | 2.15 |
| 490 | 13.4 | 2.45 |
| 540 | 19.2 | 2.47 |
| 580 | 24.1 | 2.24 |
| 630 | 24.7 | 2.20 |

EXAMPLE 26

This example illustrates the use of the strong acid-strong base floc for deionization. A floc was prepared according to Example 22, the quantities of strong base and strong acid resin emulsions being selected to yield 200 mg of floc containing 40% cation and 60% anion emulsion resin. This floc was transferred to a ½-inch (1.3 cm) diameter glass tube containing a 100-mesh nylon screen. A solution containing 9.76 ppm NaCl calculated as CaCO$_3$ was allowed to pass downward through the tube at a flow rate of 3.7 gpm/ft$^2$ (18 ml/minute absolute flow rate) at room temperature, at an inlet pressure of 25 psi (1.70 atmosphere). The pressure drop across the bed and the specific resistance of the effluent are monitored. Breakthrough is defined as the point at which the effluent resistivity declines to 4.0 megohm-cm (approximately 10% leakage). This breakthrough occurs at about 23.5 minutes, and is equivalent to a calculated capacity of 0.48 g Cl$^-$/g dry anion resin. The results of this determination are tabulated in Table III below:

TABLE III

| Time, Minutes | Pressure Drop, psi | Specific Resistance megohm-cm |
|---|---|---|
| 1 | 0 | 6.20 |
| 3 | 0 | 7.60 |
| 6 | 0 | 8.40 |
| 10 | 0 | 8.40 |
| 15 | 0 | 8.20 |
| 20 | 0 | 6.00 |
| 25 | 0 | 3.10 |
| 30 | 0 | 1.60 |
| 40 | 0 | 0.60 |
| 50 | 0 | 0.275 |
| 60 | 0 | 0.140 |
| 70 | 0 | 0.094 |

EXAMPLE 27

This example illustrates the decolorization of a washed, raw sugar solution using emulsion ion exchange resins. A 125-ml sample of washed, raw sugar solution, typical of that received at refineries, and having an ICUMSA color of 900 and a concentration of 65° Brix is heated to 80° C. To this is added 0.20 g, dry basis (equivalent to 2000 parts resin per million parts sugar solids), of strongly basic anion exchange resin emulsion in the chloride form, made from the emulsion copolymer of Example 1, coagulated according to Example 2, chlorinated and aminolyzed according to Example 17. The mixture is stirred for five minutes, and is then transferred to a pressure filter where it is filtered through diatomaceous earth supported on coarse filter paper. The sugar solution filters rapidly, and the filtrate is a clarified, decolorized solution with an ICUMSA color of 180.

The ICUMSA color determination by Revised ICUMSA Method 4 is described in the *Cane Sugar Handbook*, 10th Edition, published by John Wiley and Sons. This color determination is made at a wave length of 420 nanometers and a measured pH of 7.0, and the result is extrapolated to a sugar concentration of 100%.

EXAMPLE 28

This example illustrates the suspension in an orgaic solvent of a floc prepared from cation and anion emulsion resins. A 9-ml sample of strongly acidic emulsion cation exchange resin, prepared according to Example 4 and resuspended as a 0.5% solids emulsion according to Example 9 is mixed with an 11-ml sample of strongly basic emulsion anion exchange resin, prepared according to Example 18, rinsed as a coagulum with 4% aqueous sodium hydroxide solution to correct it to the hydroxyl form and resuspended as a 0.5% solids emulsion according to Example 9, to form a floc. The floc is transferred to a sintered glass filter funnel, allowed to drain, and rinsed with acetone to replace the water from the floc. The floc is observed to retain its flocculant character in the non-aqueous, acetone medium. The floc is subsequently dried, first in a stream of nitrogen and finally in an oven at 95° C. The dried floc is photographed using a scanning electron microscope, and is observed to have a microporous structure, that is, relatively large void spaces exist within the structure of cohered, emulsion resin beads.

We claim:

1. A process for the removal of cationic impurities, anionic impurities, particulate impurities and mixtures thereof from a liquid containing these impurities, which process comprises the steps of:
   (a) contacting the liquid with a floc of beads of one or more cation exchange resins and beads of one or more anion exchange resins in a weight ratio of from about 9:1 to about 1:9 cation resin to anion resin, the beads of each resin being approximately spherical beads of crosslinked emulsion copolymer having diameters within the range from about 0.01 to about 1.5 micrometers and bearing from about 0.7 to about 1.5 ion exchange functional groups per monomer unit, and
   (b) separating the floc from the liquid.

2. The process according to claim 1 wherein the floc is separated from the liquid by filtration.

3. The process according to claim 1 wherein the floc is prepared within the liquid by adding emulsions of the beads of each cation exchange resin and anion exchange resin to the liquid.

4. The process according to claim 1 wherein the floc is prepared prior to contacting the liquid with it.

5. The process according to claim 4 wherein the floc is supported on a mechanical filter means.

6. The process according to claim 1 wherein the functionality of the cation exchange resin beads is strongly acidic and the functionality of the anion exchange resin beads is strongly basic.

7. The process according to claim 1 wherein the functionality of the cation exchange resin beads is strongly acidic and the functionality of the anion exchange resin beads is weakly basic.

8. The process according to claim 1 wherein the functionality of the cation exchange resin beads is weakly acidic and the functionality of the anion exchange resin beads is strongly basic.

9. The process of claim 1 wherein the functionality of the cation exchange resin beads is weakly acidic and the functionality of the anion exchange resin beads is weakly basic.

10. The process of claim 9 wherein the floc, after removing cationic and anionic impurities from the liquid at a relatively low temperature, is regenerated by contacting it with an aqueous liquid at a relatively high temperature.

* * * * *